(12) United States Patent
Okamura et al.

(10) Patent No.: US 11,332,198 B2
(45) Date of Patent: May 17, 2022

(54) STRUCTURE OF JOINED CHANNEL-SHAPED PLATES

(71) Applicants: TOYOTA JIDOSHA KABUSHIKI KAISHA, Aichi (JP); SUBARU CORPORATION, Tokyo (JP)

(72) Inventors: Junya Okamura, Tokyo-to (JP); Tomohiro Matsumoto, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/129,909

(22) Filed: Dec. 22, 2020

(65) Prior Publication Data

US 2021/0214018 A1    Jul. 15, 2021

(30) Foreign Application Priority Data

Jan. 14, 2020 (JP) .............................. JP2020-003773

(51) Int. Cl.
*B62D 25/02* (2006.01)
*B62D 27/02* (2006.01)

(52) U.S. Cl.
CPC ........... *B62D 27/023* (2013.01); *B62D 25/02* (2013.01); *B62D 25/025* (2013.01)

(58) Field of Classification Search
CPC ..... B62D 25/02; B62D 25/025; B62D 27/023
USPC ........................................... 296/209, 29, 30
See application file for complete search history.

(56) References Cited

U.S. PATENT DOCUMENTS

| 8,424,912 B2 * | 4/2013 | Favaretto | B62D 29/008 |
| | | | 280/781 |
| 9,950,747 B2 * | 4/2018 | Mashio | B62D 21/10 |
| 2016/0046330 A1 * | 2/2016 | Elfwing | B62D 21/02 |
| | | | 296/193.01 |

FOREIGN PATENT DOCUMENTS

| JP | H8268340 A | 10/1996 |
| JP | 201296718 A | 5/2012 |

* cited by examiner

*Primary Examiner* — Dennis H Pedder
(74) *Attorney, Agent, or Firm* — Hauptman Ham, LLP

(57) ABSTRACT

The disclosure herein provides a technique that provides increased strength to a jointed site of ends of two channel-shaped plates. A first (second) channel-shaped plate includes an elongated first (second) main plate, a first (second) upper flange, and a first (second) lower flange. The first channel-shaped plate includes a first extension at an end thereof, the first extension extending from the first lower flange and a lower part of the first main plate, and extending in a longitudinal direction of the channel-shaped plate. The second channel-shaped plate includes a second extension same as the first extension. The ends of the first and the second channel-shaped plates are assembled and joined such that the first extension is located outside the second channel-shaped plate and the second extension is located outside the first channel-shaped plate. A reinforcement plate is joined to both of the first main plate and the second main plate.

6 Claims, 9 Drawing Sheets

STRUCTURE OF JOINED CHANNEL-SHAPED PLATES

CROSS-REFERENCE TO RELATED APPLICATION

This application claims priority to Japanese Patent Application No. 2020-3773 filed on Jan. 14, 2020, the contents of which are hereby incorporated by reference into the present application.

TECHNICAL FIELD

The technique disclosed herein relates to a structure of joined ends of two channel-shaped plates. Each of these channel-shaped plates is a beam comprising an elongated main plate, and upper and lower flanges that are provided respectively at both ends of the main plate and extend in the same direction. In other words, the channel-shaped plates are angular U-shaped beams. It should be noted that the terms "upper" and "lower" in the upper flange and the lower flange are used merely to distinguish the two flanges each other, thus the upper flange may not necessarily be positioned above the lower flange. The upper flange and the lower flange may be at the same height level.

BACKGROUND

Frames of a vehicle, such as a side member, a crossmember, and a rocker (side sill), are often configured of angular tubes. Such angular tubes are described in Japanese Patent Application Publication Nos. 2012-096718 and H8-268340, for example. As exemplified in Japanese Patent Application Publication No. H8-268340, an angular tube is formed by jointing two channel-shaped plates facing each other.

SUMMARY

Ends of two channel-shaped plates may be jointed to each other. The disclosure herein provides a technique that provides increased strength to a jointed site of ends of two channel-shaped plates.

The disclosure herein discloses a structure of jointed ends of two channel-shaped plates (first and second channel-shaped plates). The first channel-shaped plate may comprise a first main plate, a first upper flange, and a first lower flange. The second channel-shaped plate may comprise a second main plate, a second upper flange, and a second lower flange. The structure disclosed herein may further comprise a reinforcement plate. Hereinbelow, a longitudinal direction of the main plates of these channel-shaped plates will be referred to simply as a longitudinal direction.

The first channel-shaped plate may include a first extension at an end thereof. The first extension extends from the first lower flange and a lower part of the first main plate, and extends in the longitudinal direction. The second channel-shaped plate may include a second extension at an end thereof. The second extension extends from the second upper flange and an upper part of the second main plate, and extends in the longitudinal direction. The end of the first channel-shaped plate and the end of the second channel-shaped plate may be assembled and joined such that the first extension is located outside the second channel-shaped plate and the second extension is located outside the first channel-shaped plate. The reinforcement plate may be joined to both of the first main plate and the second main plate.

In the above structure, the first extension of the first channel-shaped plate and the second extension of the second channel-shaped plate are adjacent to each other along an up-down direction, and the reinforcement plate is joined thereto. Thus, the structure can provide increased strength to the joined site of the two channel-shaped plates.

Details and further improvements of the technique disclosed herein will be described in Detailed Description below.

DETAILED DESCRIPTION

Figure 1:
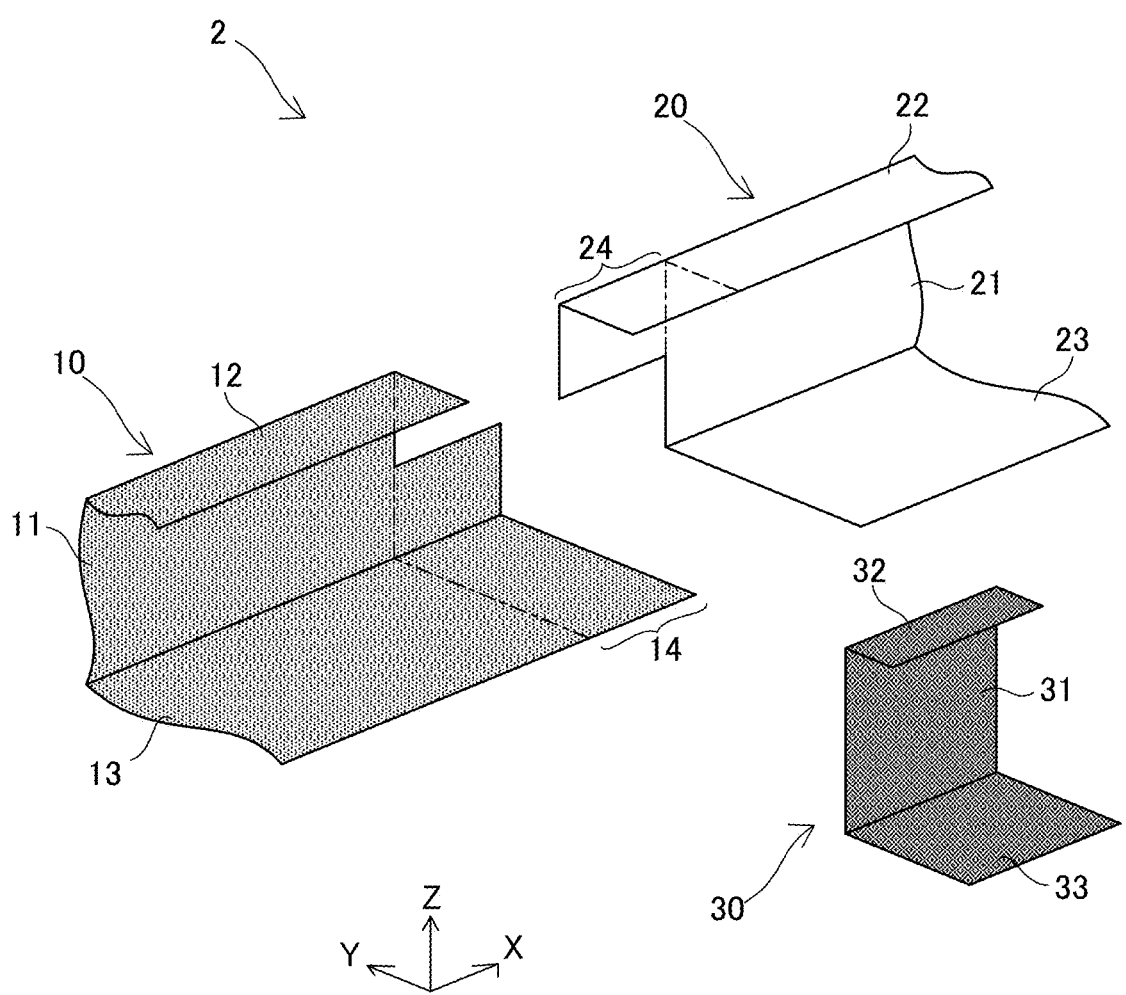
FIG. 1 is a perspective view for a first channel-shaped plate, a second channel-shaped plate, and a reinforcement plate in disassembled state.

A structure 2 according to an embodiment will be described with reference to the drawings. The structure 2 is a structure of joined two channel-shaped plates (a first channel-shaped plate 10 and a second channel-shaped plate 20). A channel-shaped plate means a beam in which flanges are provided on both widthwise edges of an elongated main plate, respectively. The flanges are provided at the same side of the main plate, such that they face each other. For convenience sake, one of the flanges will be termed an upper flange and the other of the flanges will be termed a lower flange. FIG. 1 shows only vicinities of one end of the first channel-shaped plate 10 and one end of the second channel-shaped plate 20, and omits showing other ends of the first channel-shaped plate 10 and the second channel-shaped plate 20.

In the drawings, an X direction in the coordinate system corresponds to a longitudinal direction of main plates 11, 21, and +Z direction in the coordinate system corresponds to an up direction. As mentioned, "upper" is defined merely for convenience of explanation, thus the +Z direction may correspond to a down direction or a lateral direction.

Figure 2:
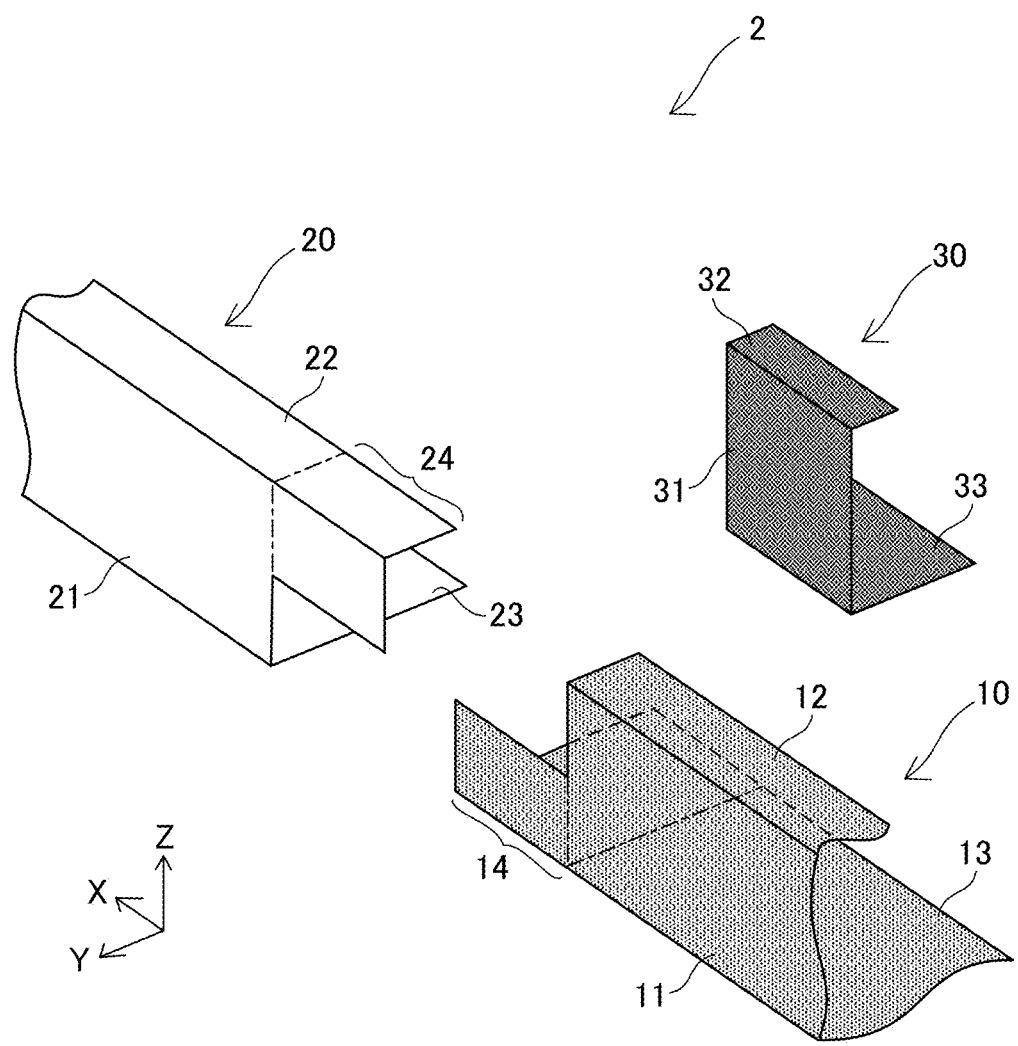
FIG. 2 is a perspective view for the first channel-shaped plate, the second channel-shaped plate, and the reinforcement plate in disassembled state (viewed from a different angle).

The structure 2 comprises a reinforcement plate 30, in addition to the first channel-shaped plate 10 and the second channel-shaped plate 20. FIG. 1 shows the first channel-shaped plate 10, the second channel-shaped plate 20, and the reinforcement plate 30 in disassembled state. FIG. 2 shows these plates viewed from a different angle.

The first channel-shaped plate 10 comprises an elongated first main plate 11, a first upper flange 12, and a first lower flange 13. The first upper flange 12 and the first lower flange 13 are provided at both widthwise edges of the first main plate 11, respectively. The first upper flange 12 and the first lower flange 13 are provided on the same side of the first main plate 11. A height of the first lower flange 13 (a distance from the first main plate to a distal end of the flange) is greater than a height of the first upper flange 12. No limitation is placed on the flange height.

The second channel-shaped plate 20 comprises an elongated second main plate 21, a second upper flange 22, and a second lower flange 23. The second channel-shaped plate 20 has the same structure as the first channel-shaped plate 10.

FIG. 2 is a perspective view for back sides of the main plates. The back side of the main plate refers to the opposite side from the side where the flanges are provided.

The reinforcement plate 30 is also a channel-shaped plate and comprises a middle plate 31, an upper flange 32, and a lower flange 33. For easier understanding, the first channel-shaped plate 10 is shown in pale gray and the reinforcement plate 30 is shown in deep grey.

The first channel-shaped plate 10 comprises a first extension 14 at an end thereof. The first extension 14 extends from the first lower flange 13 and a lower part of the first main plate 11 and extends in the longitudinal direction of the first main plate 11 (the X direction). The second channel-shaped plate 20 comprises a second extension 24 at an end thereof that faces the end of the first channel-shaped plate 10. The second extension 24 extends from the second upper flange 22 and an upper part of the second main plate 21 and extends in the longitudinal direction (the X direction). Dot-dashed lines in the drawings indicate boundaries of the extensions.

Figure 3:
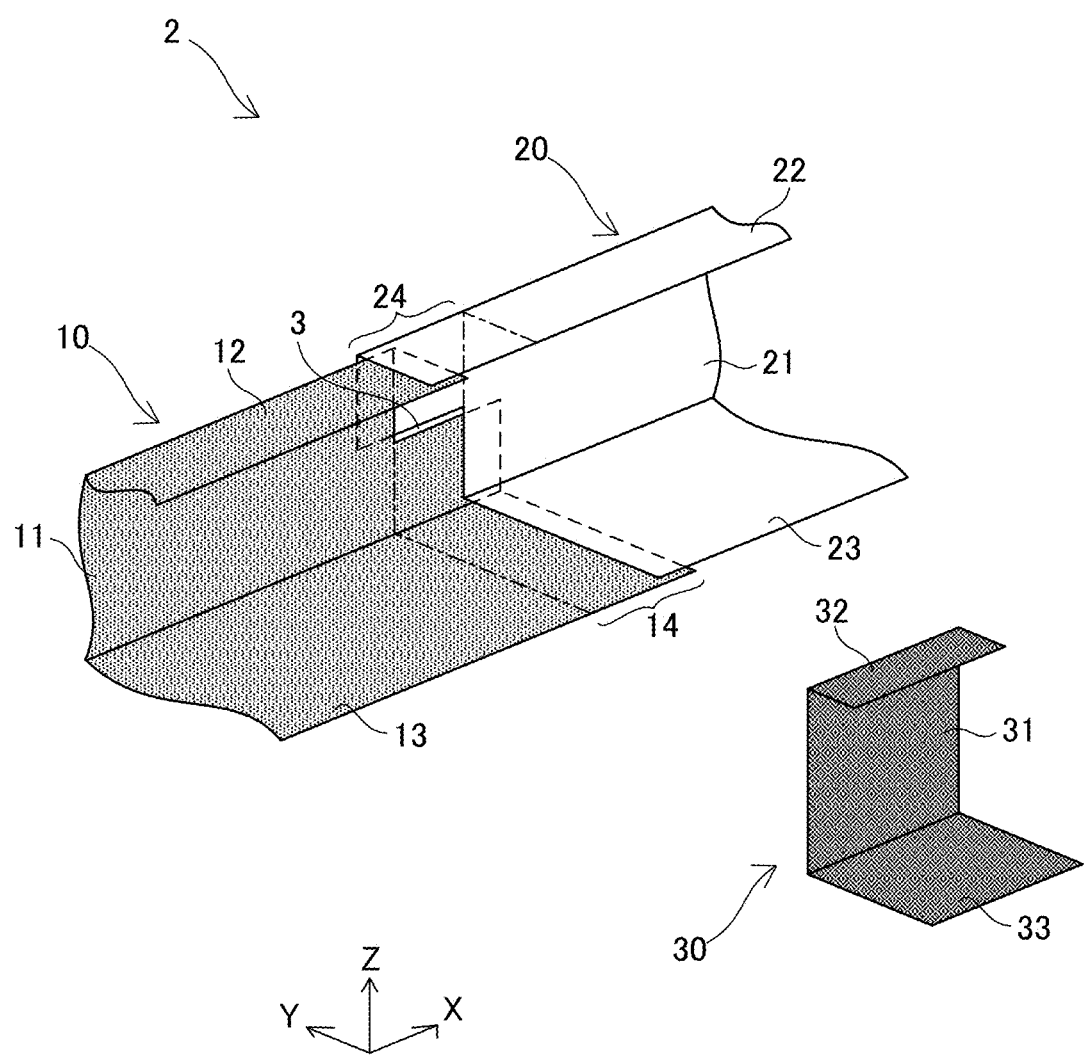
FIG. 3 is a perspective view for the first channel-shaped plate and the second channel-shaped plate in assembled state.
Figure 4:
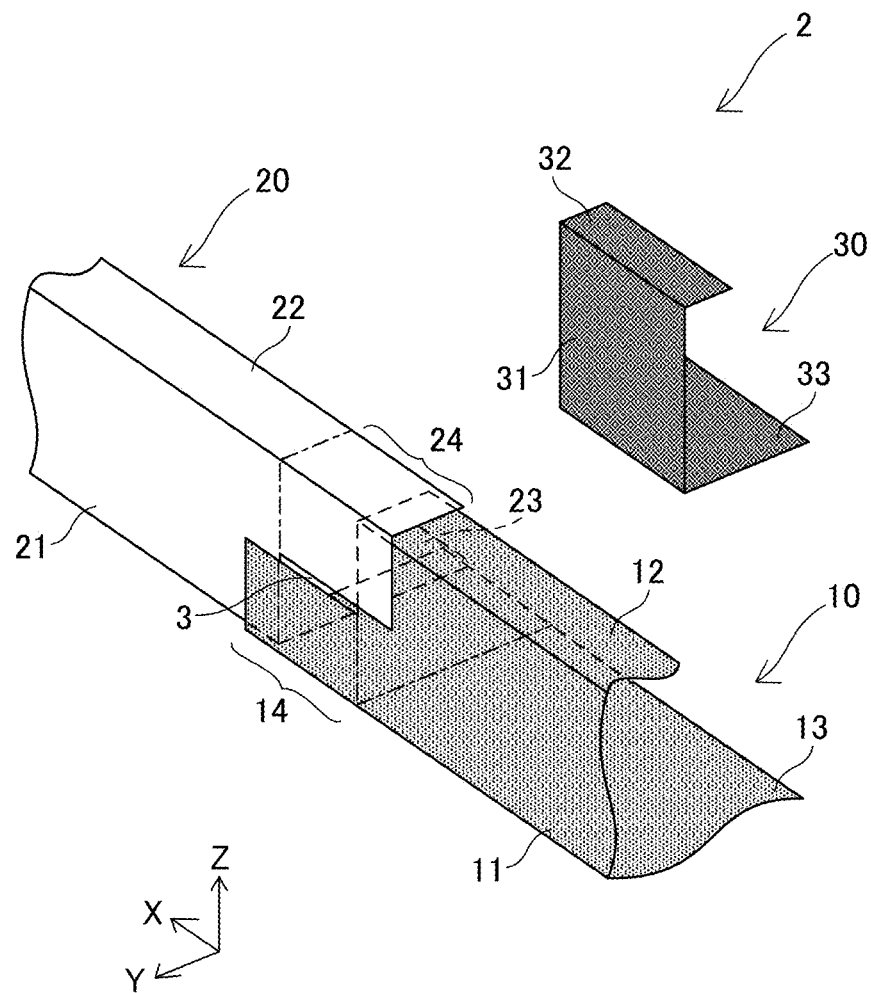
FIG. 4 a perspective view for the first channel-shaped plate and the second channel-shaped plate in assembled state (viewed from a different angle).

FIG. 3 is a perspective view for the first channel-shaped plate 10 and the second channel-shaped plate in assembled state. FIG. 4 shows FIG. 3 from a different angle. FIG. 4 is a perspective view for the back sides of the main plates. In FIGS. 3 and 4, a part of the first channel-shaped plate 10 that is hidden by the second channel-shaped plate 20 is shown in white.

As shown in FIGS. 3 and 4, the end of the first channel-shaped plate 10 and the end of the second channel-shaped plate 20 are assembled such that the first extension 14 is located outside the second channel-shaped plate 20 and the second extension 24 is located outside the first channel-shaped plate 10. Here, "outside the channel-shaped plate" means on the back side of the main plate, that is, on the side of the main plate where the flanges are not provided.

A hole 3 is defined in an area surrounded by the first extension 14 and the second extension 24.

Figure 5:
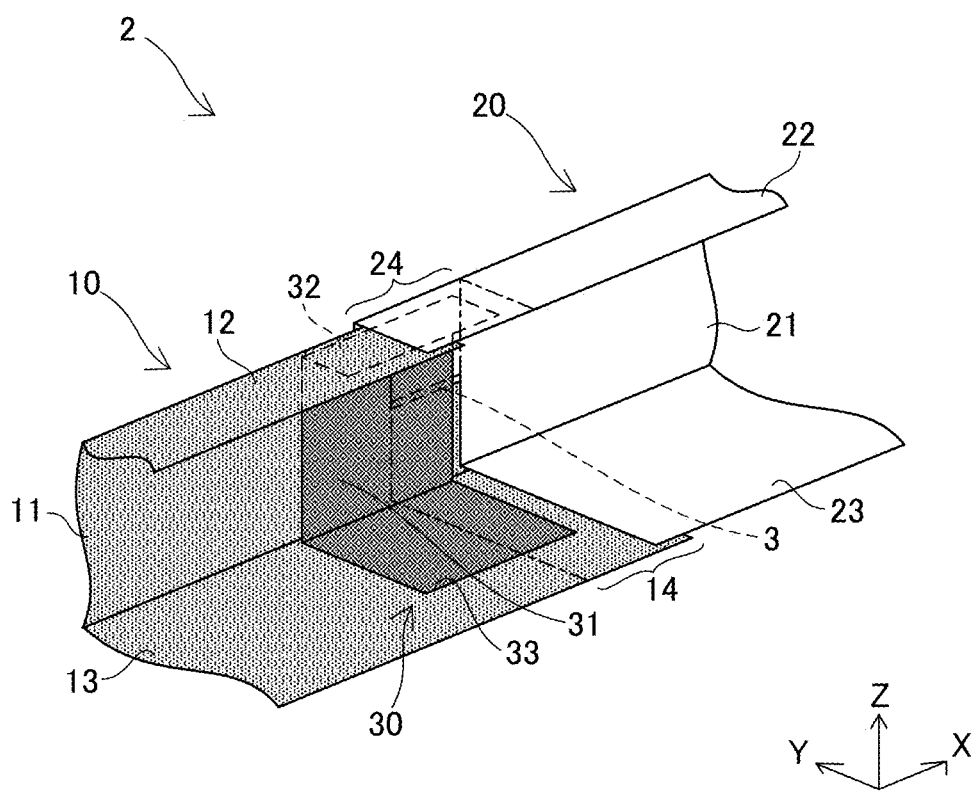
FIG. 5 is a perspective view for the first channel-shaped plate and the second channel-shaped plate in assembled state with the reinforcement plate joined.

FIG. 5 shows a perspective view with the reinforcement plate 30 attached. The reinforcement plate 30 is disposed on inner sides of the first channel-shaped plate 10 and the second channel-shaped plate 20 (that is, between the pair of flanges). The reinforcement plate 30 covers most of the hole 3 surrounded by the first extension 14 and the second extension 24.

Figure 6:
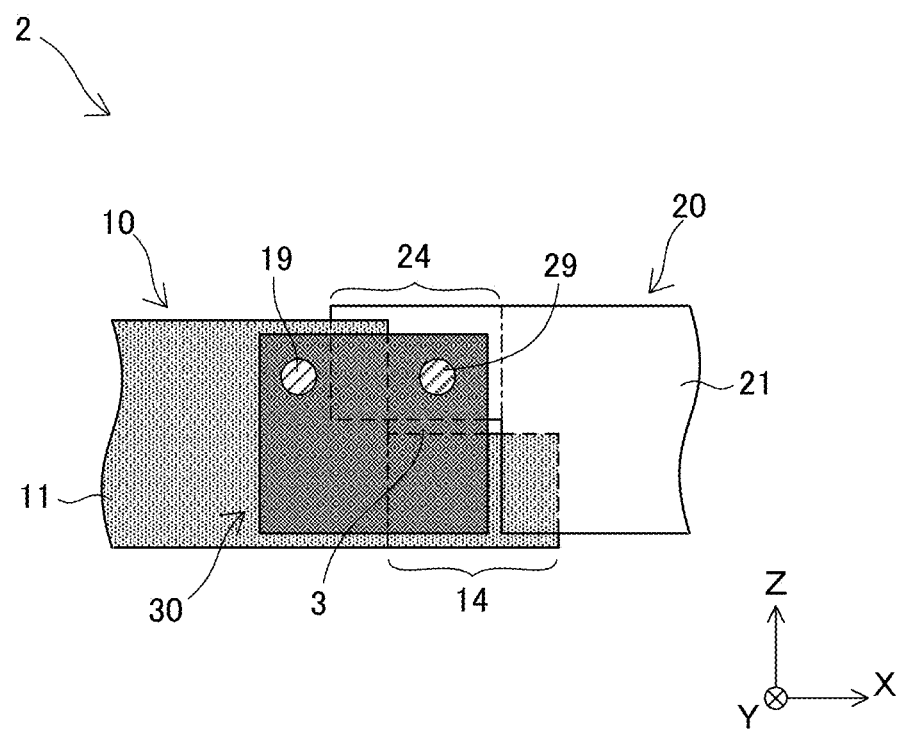
FIG. 6 is a plan view for the first channel-shaped plate and the second channel-shaped plate in assembled state with the reinforcement plate joined.

FIG. 6 shows a plan view of the structure 2 (plan view for the first channel-shaped plate 10 and the second channel-shaped plate 20 with the reinforcement plate 30 attached). Spots indicated with reference signs 19 and 29 are joint spots. The reinforcement plate 30 is jointed to the first main plate 11 of the first channel-shaped plate 10 (at the joint spot 19). The reinforcement plate 30 is joined to a portion of the second extension 24 of the second channel-shaped plate 20 that extends from the second main plate 21 (at the joint spot 29).

In the structure 2 described above, the first channel-shaped plate 10 and the second channel-shaped plate 20 comprise the first extension 14 and the second extension 24, respectively. These extensions 14 and 24 are assembled together and reinforced by the reinforcement plate 30. This realizes the structure with increased strength. The increased strength is brought especially by the channel-shaped plates being assembled such that the first extension 14 is located outside the second channel-shaped plate 20 and the second extension 24 is located outside the first channel-shaped plate 10.

Figure 7:
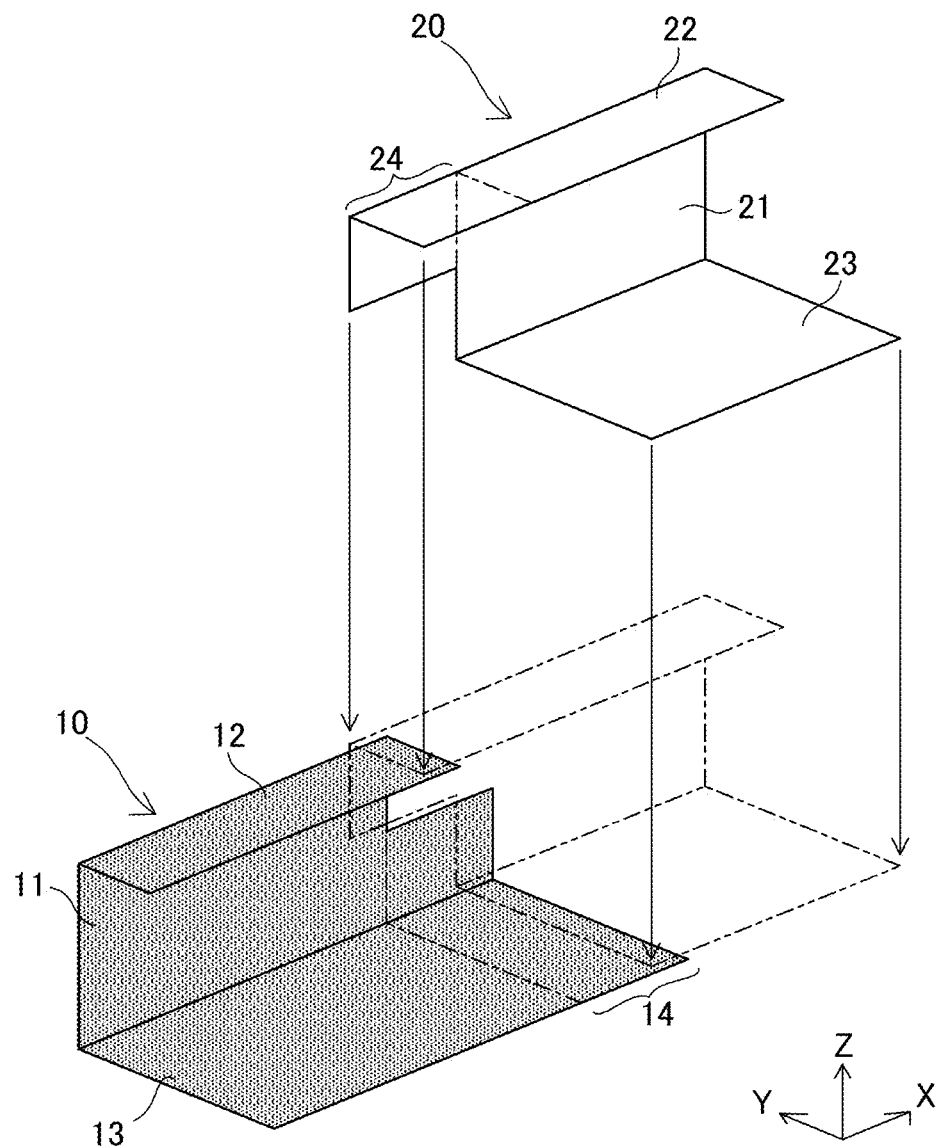
FIG. 7 is a perspective view for the first channel-shaped plate and the second channel-shaped plate disassembled in an up-down direction.

Another advantage of the structure according to the embodiment will be described. FIG. 7 shows a perspective view for the first channel-shaped plate 10 and the second channel-shaped plate 20 in disassembled state. In FIG. 7, the second channel-shaped plate 20 including the second upper flange 22 with the second extension 24 is shown above the first channel-shaped plate 10. The second channel-shaped plate 20 including the second upper flange 22 with the second extension 24 can be assembled to the first channel-shaped plate 10 including the first lower flange 13 with the first extension 14 from above (+Z direction). In other words, the second channel-shaped plate 20 can be assembled to the first channel-shaped plate 10 by being moved along an alignment direction of its upper and lower flanges.

Figure 8:
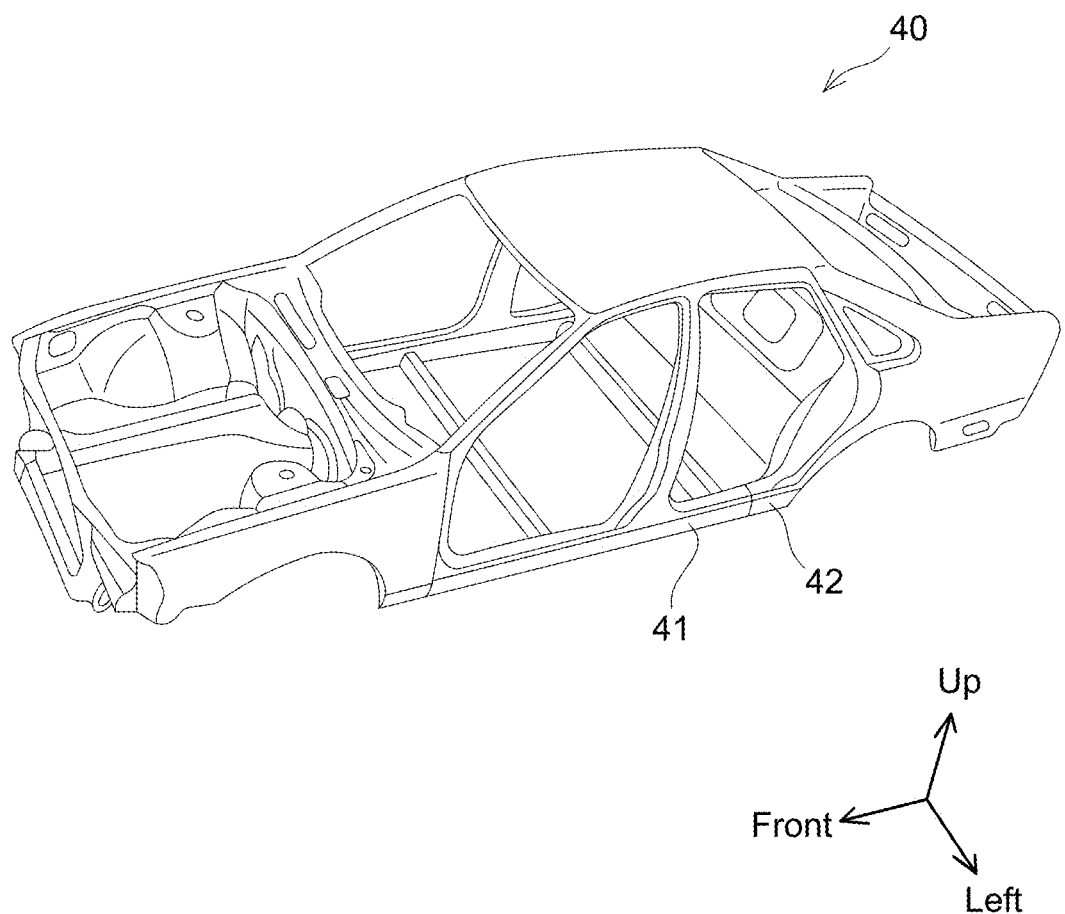
FIG. 8 is a perspective view for a vehicle frame with a structure of an embodiment.

Owing to the above advantage, applying the structure in a vehicle frame brings another advantage. For example, as shown in FIG. 8, it is assumed that the first channel-shaped plate 10 including the first lower flange 13 with the first extension 14 is employed in an inner rocker panel 41 of a vehicle frame 40 and the second channel-shaped plate 20 including the second upper flange 22 with the extension 24 is employed in a rear side member 42 of the vehicle frame 40. In this case, a vehicle rear frame including the rear side member 42 can be assembled to a vehicle lower frame including the inner rocker panel 41 from above.

Points to be noted regarding the technique described in the embodiment will be described. Each of the first channel-shaped plate 10 and the second channel-shaped plate 20 comprises the lower flange that is higher than the upper flange. The upper flange and the lower flange may have the same height or may have different heights.

Figure 9:
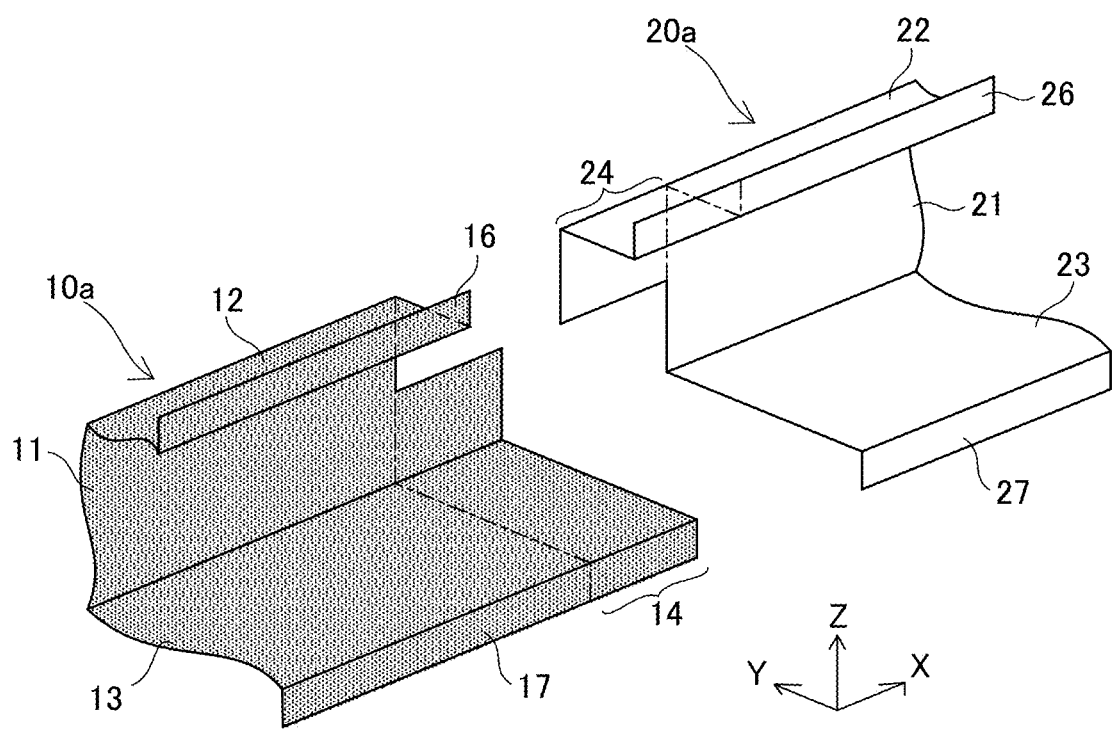
FIG. 9 is a perspective view for a first channel-shaped plate and a second channel-shaped plate in disassembled state according to a variant.

FIG. 9 shows a perspective view for a first channel-shaped plate 10a and a second channel-shaped plate 20a according to a variant of the embodiment in disassembled state. The first channel-shaped plate 10a comprises a rib 16 that extends upward from a distal end of the first upper flange 12 and a rib 17 that extends downward from a distal end of the first lower flange 13. For example, an inner rocker panel includes the ribs 16 and 17. Although not shown, an outer rocker panel is similarly a channel-shaped plate and includes ribs at distal ends of its upper flange and lower flange, respectively. The ribs of the inner rocker panel are joined to the ribs of the outer rocker panel, which results in a rocker having a rectangular tube shape. Similarly, the second channel-shaped plate 20a comprises a rib 26 that extends upward from a distal end of the second upper flange 22 and a rib 27 that extends downward from a distal end of the second lower flange 23. The first and second channel-shaped plates having the shapes shown in FIG. 9 can also realize the structure 2 according to the embodiment.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A structure of joined channel-shaped plates, the structure comprising:
   a first channel-shaped plate including an elongated first main plate, a first upper flange, and a first lower flange, the first upper flange and the first lower flange provided respectively at both edges of the first main plate and facing each other;
   a second channel-shaped plate including an elongated second main plate, a second upper flange, and a second lower flange, the second upper flange and the second lower flange provided respectively at both edges of the second main plate and facing each other; and
   a reinforcement plate,
   wherein
   the first channel-shaped plate includes a first extension at an end thereof, the first extension extending from the first lower flange and a lower part of the first main plate, and extending in a longitudinal direction of the first main plate,
   the second channel-shaped plate includes a second extension at an end thereof, the second extension extending from the second upper flange and an upper part of the second main plate, and extending in a longitudinal direction of the second main plate,
   the end of the first channel-shaped plate and the end of the second channel-shaped plate are assembled and joined such that the first extension is located outside the second channel-shaped plate and the second extension is located outside the first channel-shaped plate, and
   the reinforcement plate is joined to both of the first main plate and the second main plate.

2. The structure of claim 1, wherein the reinforcement plate covers a hole surrounded by the first extension and the second extension.

3. The structure of claim 1, wherein the reinforcement plate is welded to the second extension.

4. The structure of claim 1, wherein
   the reinforcement plate has a channel shape including a middle plate, an upper flange, and a lower flange, and
   the upper flange and the lower flange are provided respectively at both edges of the middle plate.

5. The structure of claim 1, wherein
   the first channel-shaped plate is a first member extending along a front-rear direction of a vehicle, and
   the second channel-shaped plate is a second member joined to a rear end of the first member.

6. The structure of claim 5, wherein
   the first member is a rocker of the vehicle, and
   the second member is a rear side member joined to a rear end of the rocker.

* * * * *